United States Patent Office 2,711,367
Patented June 21, 1955

2,711,367
WEED KILLER CONTAINING BORAX

Clifford A. Parish, Sr., Kansas City, Mo.

No Drawing. Application September 4, 1951,
Serial No. 245,096

3 Claims. (Cl. 71—2.2)

This invention relates to a composition of matter in the nature of a herbicide particularly adapted to kill weeds, grasses and other undesirable growths along railroad right-of-ways.

It is the universal practice of railroad companies to periodically spray the weeds along their right-of-ways, and around trestles and bridges to eliminate the fire hazard which would otherwise result by permitting the weeds to continue growing and ultimately die and become dry. Liquid herbicides carried in tank cars are used where the weeds to be killed are along a clear and open right-of-way and can be sprayed, but normally, when the weeds to be destroyed are located around trestles and bridges, a substantially dry herbicide, carried on flat cars, must be utilized.

The liquid weed killer presently used is not particularly hazardous, but in the use of the dry material great care is required to reduce the fire hazard to the bridges and trestles to a minimum. Additionally, the train must be stopped to permit the workmen to spread the dry weed killer around and under the railway structures.

Such requirements and restrictions limit the number of miles that may be covered in a given period of time, and because of such tedious and slow methods, there is a great need for a safe and efficient herbicide that may be easily and quickly sprayed on and the like.

Borax is an ideal weed killer and has been used for that purpose for many years, but no method has previously been developed for placing the borax into solution in sufficient quantity to permit satisfactory use thereof as a spray. Borax in solution is of course, available, but such solutions are so weak that their killing power is not sufficiently great to make the use of the solution economically feasible. Also, borax in the dry or substantially dry state is an irritant to those required to manually handle it.

It is, therefore, the primary object of the present invention to present a herbicide having sufficiently large quantities of borax to render its use as a spray satisfactory and practical, and one which can be applied around railway structures with little fear of fires resulting from its use.

Another object of this invention is to present a weed killer that is not likely to cause injury to those who are required to handle the spraying apparatus.

In order to obtain a suspension having a large quantity of borax, ½–4 lbs. of borax is mixed with ¼–2 lbs. of aluminum sulphate and, to this mixture enough water (approximately 1–5 gallons) is added to present a slurry having the desired strength. The method of spraying adopted and the size of orifice used on the spraying device will determine in part the amount of water utilized.

There are no special requirements for mixing the composition and no particular step-by-step procedure to be followed. However, the mixture must be stirred slowly and such stirring should be continued for approximately one hour. The ingredients may be added as rapidly or as slowly as desired during the stirring time.

In mixing the aluminum sulphate, borax and water, a definite reaction appears to take place, and the extraordinary results attained from use of the product have proved synergistic action. Never before has such a large quantity of borax been placed in a form capable of passing through an ordinary spray nozzle. The end product takes the form of a white slurry in the nature of a colloid since the components tend to stay in suspension and do not settle rapidly to the bottom of the container. While the ingredients do ultimately settle, they do not cake, and the only requirement necessary to place the product in a condition suitable for spraying is to invert the container or stir momentarily with a paddle. When the herbicide is placed in a railroad tank car the slight continuous swaying of the car, while in motion, will keep the ingredients stirred and ready for use.

One requirement of the product, for railroad use particularly, is that the acidity thereof be kept as neutral as possible without reducing its effectiveness as a weed killer. Since metal tank cars are subject to acid reactions, too much acidity or alkalinity results in corrosive action and general deleterious results. For this reason the pH of the product should be maintained at approximately 6.

In addition to the above ingredients, sodium chlorate may be beneficially added in virtually any amount desired. As is well known, this is a combustible herbicide unless kept moist. When sodium chlorate is added to the water, borax and aluminum sulphate mixture, the combustibility of the product is greatly reduced and the weeds are killed much more rapidly. The rapidity of kill depends, of course, on the amount of sodium chlorate used, but in large amounts the fire hazard becomes great. The amount of sodium chlorate to be used depends therefore, on conditions at the time of spraying of the weeds. The optimum amount to be used, however, is about 1 lb. of sodium chlorate to each gallon of the solution. Sodium trichloroacetate, also a known herbicide, may be substituted for the sodium chlorate, but preferably in quantities only 25% as great.

The following chart shows some examples of the herbicide and the amounts and ranges suitable for spraying:

| Water, gallons | Borax, pounds | Aluminum Sulphate, pounds | Sodium Chlorate, pound |
|---|---|---|---|
| 1–5 | 3 | 1 | 1 |
| 1–5 | 3 | 1 |  |
| 1 | ½–4 | 1 |  |
| 1 | 3 | ¼–2 |  |

Having thus described the invention what is claimed as new and desired to be secured by Letters Patent is:

1. A herbicidal composition comprising a slurry produced by admixing from ¼ to 2 pounds of aluminum sulphate; from ½ to 4 pounds of borax; and from 1 to 5 gallons of water.

2. The process of destroying weeds and the like which comprises subjecting the same to a slurry produced by admixing from ¼ to 2 pounds of aluminum sulphate; from ½ to 4 pounds of borax; and from 1 to 5 gallons of water at a rate sufficient to destroy said weeds.

3. A herbicidal composition comprising a slurry produced by mixing borax and aluminum sulphate with a predetermined quantity of water, there being present a greater concentration of borax than said water is capable of dissolving and a sufficient quantity of aluminum sulphate to produce a substantially stable suspension.

References Cited in the file of this patent

Mellor, "A Comprehensive Treatise on Inorganic and Theoretical Chemistry," vol. 5 (1924) page 102.

"Bibliography of the Literature on the Minor Elements . . ." 4th edition, vol. 1, column 31 (page 16) (1948).

Montana Agr. Exp. Station War Circular No. 2 (1943) 10 pages.